United States Patent [19]
Seigel

[11] 3,745,445
[45] July 10, 1973

[54] MAGNETIC INDUCED POLARIZATION METHOD FOR GEOPHYSICAL PROSPECTING

[75] Inventor: Harold Oscar Seigel, Willowdale, Ontario, Canada

[73] Assignee: Scintrex Limited, Concord, Ontario, Canada

[22] Filed: Nov. 23, 1970

[21] Appl. No.: 91,965

[52] U.S. Cl. .............................. 324/1, 324/6, 324/8
[51] Int. Cl. .......................... G01v 3/06, G01v 3/08
[58] Field of Search .................................... 324/5–8, 324/1

[56] References Cited
UNITED STATES PATENTS

| | | | |
|---|---|---|---|
| 2,169,685 | 8/1939 | Evjen | 324/1 |
| 2,966,627 | 12/1960 | Hawkins | 324/9 X |
| 3,525,037 | 8/1970 | Madden et al. | 324/6 X |
| 3,210,652 | 10/1965 | Seigel | 324/6 X |
| R24,464 | 4/1958 | Yost | 324/7 X |
| 3,123,767 | 3/1964 | Ghose | 324/6 |
| 2,231,013 | 2/1941 | Klipsch et al. | 324/1 |
| 2,730,673 | 1/1956 | Jakosky | 324/7 |

Primary Examiner—Gerard R. Strecker
Attorney—Fetherstonhaugh & Co.

[57] ABSTRACT

This application concerns a method of geophysical prospecting wherein one creates a polarized condition in the medium being explored by conductively passing primary electric currents of repetitive wave form through the medium at two distinct frequencies in the active induced polarization range which differ from each other by at least a factor of 2, maintaining the ratio of the electric current amplitudes of said wave forms at said distinct frequencies substantially constant, measures the magnitude of a magnetic field component primarily due to current flow in the medium at each of said distinct frequencies and comparing said magnitudes to obtain an indication of the presence of regions of anomalous induced polarization.

4 Claims, 7 Drawing Figures

MAGNETIC INDUCED POLARIZATION METHOD FOR GEOPHYSICAL PROSPECTING

This invention relates to improvements in the making of induced polarization measurements utilizing magnetic field detection devices. More particularly it relates to methods wherein magnetic field induced polarization measurements are made by measuring the change in amplitude of a magnetic field component at different frequencies of the primary electric current. The selection of frequencies employed for a given environment will depend upon induced polarization characteristics and electromagnetic induction response characteristics of the environment.

The induced polarization method of geophysical exploration using electrical fields has come to be widely accepted and used in the search for metallic conducting minerals since the original thesis herein by Harold O. Seigel in 1949.

A review of the induced polarization method is to be found in a paper by Harold O. Seigel entitled "The Induced Polarization Method In Mining and Groundwater Geophysics" (1967 Geological Survey of Canada, Economic Geology Report, No. 26, p. 123–137).

In its broadest aspect this invention is a method of prospecting comprising creating a polarized condition in the medium being explored by conductively passing primary electric currents of repetitive wave form through the medium at two distinct frequencies in the active induced polarization range which differ from each other by at least a factor of 2, maintaining the ratio of the electric current amplitudes of said wave forms at said distinct frequencies substantially constant, measuring the magnitude of a magnetic field component primarily due to current flow in the medium at each of said distinct frequencies and comparing said magnitudes to obtain an indication of the presence of regions of anomalous induced polarization.

The invention will be clearly understood after reading the following detailed specification in conjunction with the drawings.

In the drawings:

FIG. 1 shows typical apparent conductivity and phase angle curves for moderately polarizable geological material. These curve forms may vary considerably depending upon the type of geological material;

FIG. 2 ilustrates a mathematical representation of the theory involved;

The induced polarization technique known as the "Frequency Domain" method entails the passage of sine wave form currents of low frequencies through the ground. Since polarization effects take an appreciable time to build up it can be seen that as the frequency is decreased the apparent resistivities or transfer impedances between the current and measuring circuits will increase.

Figure 1:
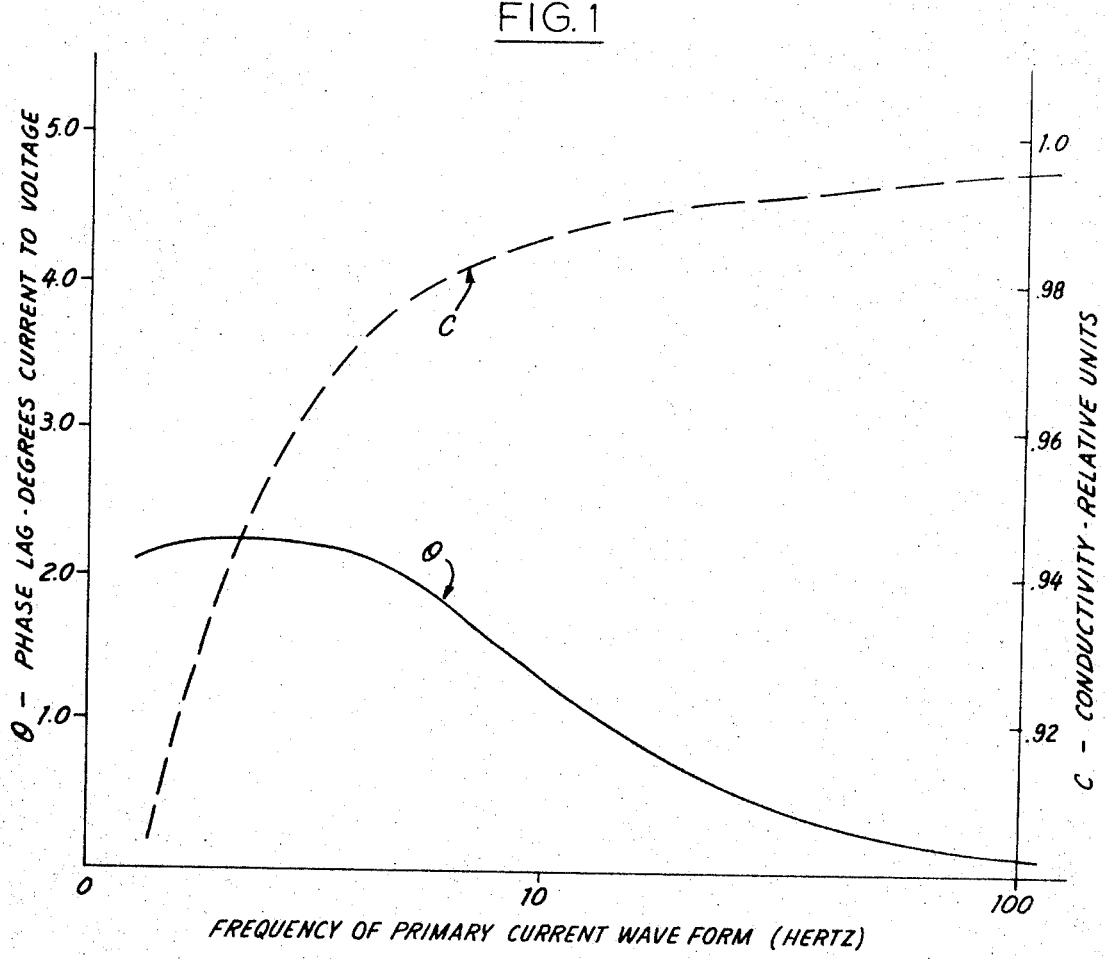

FIG. 1 shows typical curves of apparent conductivity and phase angle (i.e. the "complex admittance") of moderately polarizable geologic materials, plotted with respect to the fundamental frequency of an applied repetitive current form. Both the fact of the variation of apparent conductivity with frequency and the presence of phase angle lags are indicative of the presence of induced polarization effects.

The frequency domain method used to date entails a comparison of apparent resistivities using sinusoidal alternating current of two or more frequencies, generally within the range of 1/10 to 10 hertz. The induced polarization factor is the "Percent Frequency Effect" or P.F.E. which is defined as $(R_1 - R_2)/R_1 \times 100$ where $R_1$ and $R_2$ are the apparent resistivities at the lower and higher frequencies respectively (eg. 0.5 and 5 hertz).

The present methods of measurement depend upon making physical contact with the earth by means of electrodes at four contact points. Energizing curret is caused to flow between the "current" contact points and earth voltages are measured between the "potential" contact points. The necessity of making earth contacts is a burdensome one, as good contacts are often difficult to make in areas of rock outcrop, loose debris or dry soil. Moreover, there was the task of laying out and reeling in large amounts of cable. All of this resulted in a time consuming, laborious and, therefore, costly operation.

It appears fundamentally desirable that the energizing current should be passed conductively (or galvanically) as opposed to inductively (as eddy current) through the earth. The latter type of energizing current would flow largely in the more highly conductive regions and thus we would get little information about regions other than those which would show up as conductors by an ordinary inductive electromagnetic survey. One of the main functions of the induced polarization method is to indicate the presence of metallic conducting mineralization under conditions where this mineralization is too sparse or too poorly interconnected to appreciably increase the overall conductivity. One must, therefore, conductively pass the energizing current into the ground.

It is common to measure electric fields as indicative of induced polarization effects but it was theoretically shown in the writer's earlier patent, eg. U.S. Pat. No. 3,210,652 that magnetic field measurements also enable us to measure the chargeability or other induced polarization characteristics.

For an understanding of te theoretical basis for the present invention, it will be helpful to repeat the presentation from the earlier patents. The action of the primary electric field in establishing induced polarization effects in a continuous medium is equivalent to the creation of a volume distribution of current dipoles. These dipoles are anti-parallel to the field at each point in the medium and have a volume current moment strength (vector notation) $\vec{M} = -m\vec{j}$ where $\vec{j}$ is the primary current density vector. The factor m is called the chargeability. For a uniform medium the ratio of the secondary over the primary electric fields or voltages is the same factor m. This quantity m, which is a measure of the induced polarization characteristics of the uniform medium under investigation, may also be obtained from measurements of appropriate magnetic field components.

Figure 2:
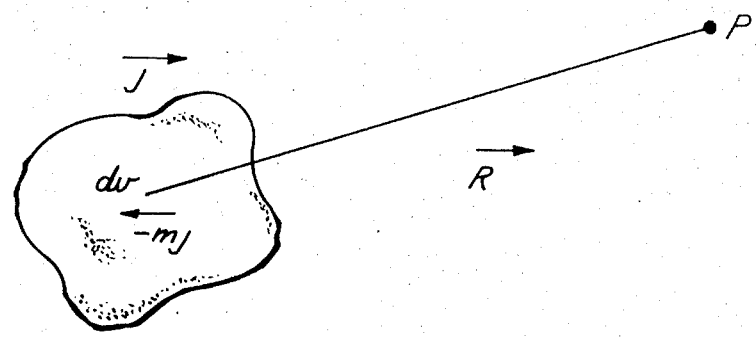

FIG. 2 will illustrate the mathematical representation. The primary magnetic vector field contribution at the point P due to a small volume dv in which the current density vector is $\vec{j}$, is given by Ampere's law (in M.K.S. units) by $$\vec{dHp} = (\vec{j} \times \vec{R}/R^3)\, dv,$$

where $\vec{R}$ is the vector from the volume element to the point P. The total primary magnetic field at the Point P may therefore be expressed by $$\vec{Hp} = \int_V \frac{\vec{j} \times \vec{R}}{R^3} dv \quad (1)$$

where $V$ is the entire volume in which currents flow. In a practical field case V will include the entire earth and also the discrete cables carrying the energizing current from the generator to the ground contact points.

It can be shown that the current dipole induced polarization results in a reversed or opposing (antiparallel) current flow of strength $-mj$. The secondary magnetic field vector, at the point P, due to these polarization currents is thus expressed in a manner similar to that used for $\vec{Hp}$, as $$\vec{Hs} = -\int_V \frac{\vec{mj} \times \vec{R}}{R^3} dv \quad (2)$$

If we measure one or more components of $\vec{Hp}$ which are only due to current flow in the earth and are not contributed to by the cables, and if we are dealing with a medium of uniform chargeability, then $$\vec{Hs} = -m\int_V \frac{\vec{j} \times \vec{R}}{R^3} dv = -m\vec{Hp} \quad (3)$$

and the ratio of the secondary to primary magnetic field components becomes $Hs/Hp = -m$, i.e. is numerically equal to the same chargeability factor determined by measuring the electric field or voltages on the ground.

Thus, in order to derive induced polarization characteristics through magnetic field measurements we must measure and compare the magnetic fields due to the normal current flow and the polarization current flow.

Figure 3:
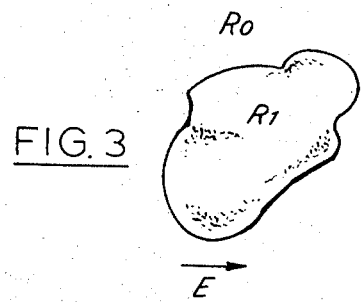
FIG. 3 shows a mass of highly polarizable material being subjected to current passage in the ground.

For a better understanding of the invention, an equivalent circuit analogy to a simple geologic example will be used. FIG. 3 shows a mass of highly polarizable material in the earth through which current is being passed under the action of the applied electric field $\vec{E}$. In a generalized way the impedance of this mass to the flow of current may be represented by a quantity $R_1$ which is both complex and a function of frequency (eg. as FIG. 1). The exterior medium (i.e. the general mass of the country rock enclosing the highly polarizable material) is considered to be of low polarization and therefore its impedance, represented by $R_o$, is largely real and largely unaffected by the frequency of the applied field.

Figure 4:
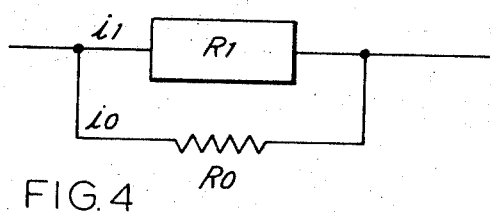
FIG. 4 shows an equivalent circuit representation of the configuration of FIG. 3 to achieve a better understanding of what actually takes place under these conditions.

FIG. 4 shows the same picture in a simple equivalent circuit form with $R_1$ being a complex function, reducing in absolute value with increasing frequency and $R_o$ being a constant real quantity. If we compare the current $i_1$ flowing through the mass $R_1$ with the current $i_o$ in the external circuit $R_o$, as a function of frequency, we will find curves of amplitude ratio and phase shift as per FIG. 5. With respect to $i_o$ therefore, we see that $i_1$ is distinguished in having (a) a phase lag relative to $i_o$ (b) a phase lag which decreases progressively as the frequency is increased (beyond a certain low frequency) and (c) a progressive increase in amplitude with increasing frequency, to an asymptotic value.

The alternating magnetic field Hp at any point P due to current flow in the mass will be given by equation 1. This field will have the same relationship of amplitude and phase versus frequency as will the current $i_1$ itself.

There are several important advantages of measuring the induced polarization effects through the magnetic fields rather than electric fields. These advantages include the following:

a. Independence of magnetic fields detection measurements on ground contacts. This is of importance in two respects, viz. 1. areas of difficult ground contact, eg. sand, loose rock, or ice covered, and 2. it permits measurements to be made in a continuously moving vehicle such an an airplane, helicopter, boat or land vehicle;

b. Ability to observe induced polarization effects through a layer of highly (ionically) conducting material such a saline overburden or salt water. Electric field measurements are effectively short circuited by such layers, but, at the low frequencies employed, these layers will be transparent to magnetic fields;

c. Elimination of the conductivity contrast "saturation" effect inherent in electric field I.P. measurements. It may be shown that the electric field I.P. response of a body at a distance from the measuring electrodes is governed in part by the conductivity contrast between the body and its environment. When this contrast becomes very large than, almost regardless of the inherent chargeability of the body, it will give rise to no appreciable I.P. response at a distance. The current flowing in the body will often be very large in relation to the mean, undisturbed current flow in the region and, providing that the frequency is low, may have a large phase lag due to the polarization characteristics of the body. Detection of magnetic field due to current flow in the body will reflect the phase shift (and, therefore the I.P. characteristics of the body) even though the electric field response is very small.

d. Improved depth penetration. The electric field response of a polarizable spherical body may be shown to drop-off as the inverse third power of its mean depth below surface. The magnetic field response of the same body may be shown to drop off as the inverse second power of the depth. Similarly, for a body of any geometry the attenuation of magnetic I.P. response with distance is one power less than for the electric I.P. case. In cases where magnetic field measured is primarily due to current flow in a polarizable body (as it will be for bodies of large extent or particularly highly conducting bodies of strike length) the magnetic field will drop off slowly with elevation above the body but the phase shift will harldy change with elevation so long as the magnetic field due to the polarizable body predominates. This makes it a very sensative tool.

Figure 6:
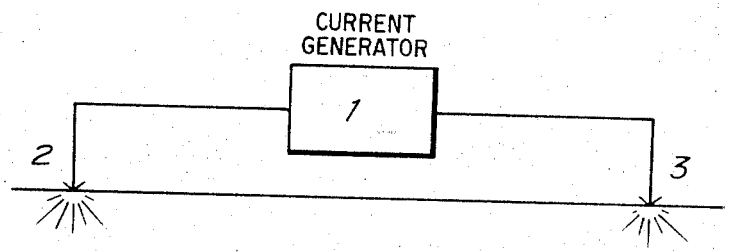
FIG. 6 shows a schematic representation of the manner in which current is caused to pass through the earth to establish induced polarization effects in one embodiment of this invention.

In FIG. 6 numeral 1 refers to a power generator capable of producing a primary electric current wave form containing as constituents one or more sinusoidal wave forms of frequencies in the range of 0–100 hertz the relative amplitudes of which constituents are accurately maintained and whose frequencies differ by at least a factor of 2 from one another. Composite wave forms with frequencies such as 1,2,5,10 and 20 Hz have beenf found effective in detecting areas of anomalous polarization, for example, zones of sulphide mineralization. Because of the superposition of the multiple sinusoidal wave forms, possible harmonically related, the resultant wave form may have a complex form, eg. a square wave form comprising the fundamental frequency and all odd harmonics, a saw tooth wave form comprising the fundamental and all odd harmonics in lesser amounts, a wave form comprising the fundamental and at least one harmonic. It will be inderstood that a half wave rectified wave form is considered as a repetitive wave form (eg. ½ wave rectified square.)

For certain embodiments of this invention, where continuous measurements are not required, it will be adequate to produce the current wave form of different frequencies consecutively rather than concurrently.

Figure 7:
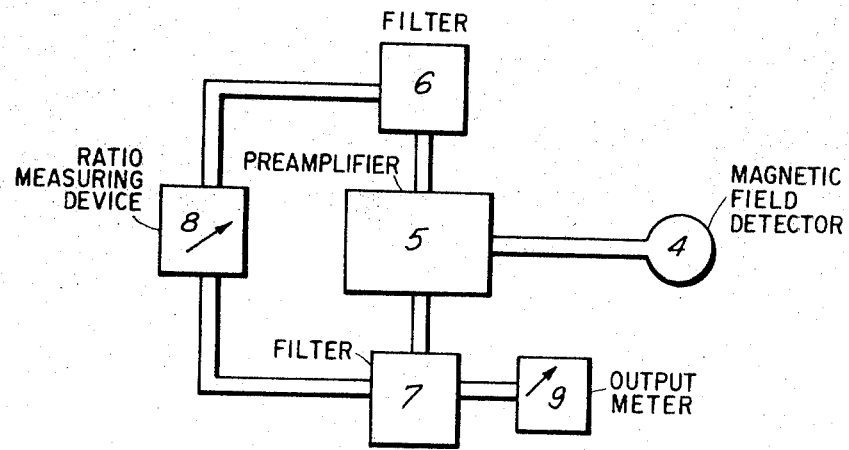
FIG. 7 shows, in block diagram form, the detecting and measuring means in one embodiment of this invention.

In this invention (eg. FIG. 7) it will be important to maintain the ratio of current amplitudes at the different frequencies constant to and preferrably within 0.1 percent. This may be achieved through the known use of saturable reactors or other current stabilizing devices.

The current output of Item 1 is passed into the ground through the contact points 2 and 3, which are usually well-grounded metal electrodes.

FIG. 7 shows an embodiment of a dectection system for one embodiment of this invention. Numeral 4 is a magnetic field detector which is so oriented as to detect primarily the magnetic field due to passage of current in the ground. This detector may be a multiturn induction coil, a fluxgate or alkali vapour magnetometer or other magnetic field sensative element, with a sufficiently broad pass band to receive signals at all the frequencies being transmitted by Item 1 above. Alternatively two or more similar magnetic field detectors may be employed, one for each transmitted frequency, in place of the single detector.

The output of the detector 4 is fed into a low-noise, distortion-free preamplifier 5. Items 6 and 7 are narrow band filters (eg. phase-lock amplifiers) which select, from the output of the preamplifier, signals of two specific transmitted frequencies. The outputs of these two filters are compared in a ratio measuring device 8. One output amplitude is displayed on an output meter 9. These two quantities (ratio and amplitude) may also be recorded on suitable analogue or digital recorders if continuous measurements are being made. If intermittent measurements are being made, a single variable-frequency filter may be employed in place of 6 and 7 and the magnetic field amplitudes at the two or more frequencies being transmitted will be measured consecutively and then compared. This invention works on the basis illustrated by FIG. 5, namely, that in areas of polarization which is higher than normal for the general environment in the area, there will be an increase in current with frequency, so long as the frequencies used in the active induced polarization range. With change in the frequency of the primary current the current paths through the earth would change, resulting in a corresponding change of magnetic field amplitude with frequency in the vicinity. It is this variation of magnetic field amplitude with frequency that can be taken as an indication of induced polarization characteristics of the medium. This a basic difference in detecting technique to the case where the variation of electric field with frequency is measured. In the latter case, it is implicitly assumed that the current flow itself is independent of frequency but that only the resistivity of the medium changes with the frequency. Measurement of electric fields, is therefore, inherently less satisfactory than that of magnetic fields because in the electric field case the decrease in resistivity ($R_1$) with increasing frequency is somewhat compensated for by the increase in current ($i_1$) with frequency, so that the voltage drop which is related to the product ($i_1R_1$) has a lesser variation with frequency than has $i_1$ of $R_1$ independently.

Figure 5:
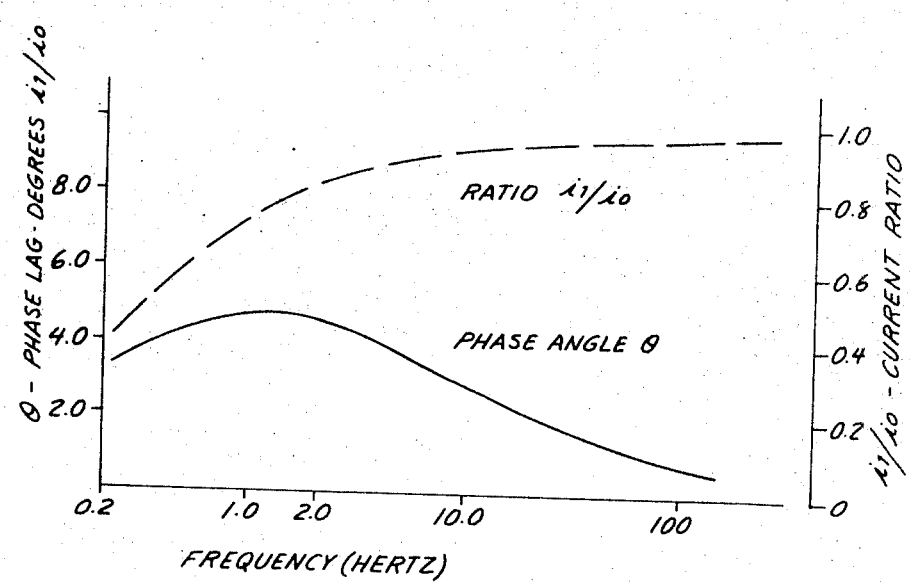
FIG. 5 shows the relative amplitudes and phase angles of the current flow through the polarizable body of FIG. 3 as a function of frequency.

It will be noted from FIG. 5 that for a change of frequency from 0.2 hertz to 2 hertz, the current through the polarizable body has increased by a factor of 2. Similarly the magnetic field due to this current has increased by a factor of 2. Thus in going from a frequency of 0.2 hertz to 2 hertz, the contribution to the total magnetic field of the current in the polarizable body had doubled. There is thus a very discernable difference in magnetic field with changes in frequency in the vicinity of such a polarizable body.

One would, therefore, transmit a composite repetitive wave form having components with a frequency of say 0.2 hertz and 2 hertz and provide detection means for detecting the magnetic field at these two frequencies and compare them as to amplitude as an indication of a polarizable anomoly.

The frequencies at which the measurements are made will vary with the medium. Induced polarization measurements are usually made at measurements below 10 hertz but in some areas useful measurements are made at frequencies as high as 100 hertz. They are made in the active induced polarization range for the medium being explored. In the case of the medium represented by FIG. 5, this would be below 10 hertz on the current ratio curve. The frequencies must differ by an amount sufficient to give a useful current ratio difference so that the resulting magnetic field component can be measured and in this respect it has been found that one frequency must be at least twice the other. Obviously increasing the frequency difference where both frequencies are on the sharply rising portion of the current ratio curve of FIG. 5 will increase the magnitude of the difference in the measured magnetic components. Frequencies that differ by a factor of about 10 are preferred but this is a matter of selection having regard to the particular form of the curves of FIG. 5 for the medium being explored.

The two frequencies are preferrably included in one primary current wave form. The output of many A.C. generators is of a square wave form, which includes a fundamental frequency and all odd harmonics. Two appropriate frequencies can be selected from this wave form as the measurement frequencies. Alternatively, the two frequencies at which measurements are made can be intermittently transmitted and the magnetic field components compared. In either case the method is essentially the same.

The embodiments of the invention in which an exclusive property or privilege is claimed are defined as follows:

1. A method of prospecting comprising creating a polarized condition in the medium being explored by conductively passing primary electric currents of repetitive wave form through the medium at two distinct frequencies in the active induced polarization range which frequencies differ from each other by at least a factor of 2, the distribution of current flow over paths through the medium at one of said frequencies being different from the distribution of current flow at said other frequency maintaining the ratio of the electric current amplitudes of said wave forms at said distinct frequencies substantially constant, measuring the magnitude of a magnetic field component primarily due to current flow over said current paths in the medium at each of said distinct frequencies and comparing said magnitudes to obtain an indication of the presence of regions of anomalous induced polarization.

2. A method of prospecting as claimed in claim 1 in which said electric currents at distinct frequencies are simultaneously transmitted.

3. A method of prospecting as claimed in claim 1 in which said electric currents at distinct frequencies are simultaneously transmitted and are part of a composite wave form.

4. A method of prospecting as claimed in claim 1 in which said electric currents at distinct frequencies are intermittently transmitted.

* * * * *